(12) United States Patent
Sanchez et al.

(10) Patent No.: US 11,909,238 B1
(45) Date of Patent: Feb. 20, 2024

(54) ENVIRONMENT-INTEGRATED SMART RING CHARGER

(71) Applicant: BlueOwl, LLC, San Francisco, CA (US)

(72) Inventors: Kenneth Jason Sanchez, San Francisco, CA (US); Theobolt N. Leung, San Francisco, CA (US); Eric Dahl, Newman Lake, WA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 16/929,641

(22) Filed: Jul. 15, 2020

Related U.S. Application Data

(60) Provisional application No. 62/990,123, filed on Mar. 16, 2020, provisional application No. 62/877,391, filed on Jul. 23, 2019.

(51) Int. Cl.
    *H01M 10/44*         (2006.01)
    *H01M 10/46*         (2006.01)
    (Continued)

(52) U.S. Cl.
    CPC .......... *H02J 7/0042* (2013.01); *A44C 9/0053* (2013.01); *H02J 7/00032* (2020.01); *H02J 7/0047* (2013.01); *H02J 7/02* (2013.01)

(58) Field of Classification Search
    CPC .... H02J 7/0042; H02J 7/0047; H02J 7/00032; H02J 50/10; H02J 50/005; A44C 9/0053
    (Continued)

(56) References Cited

U.S. PATENT DOCUMENTS

| 6,097,480 A | 8/2000 | Kaplan |
| 6,154,658 A | 11/2000 | Caci |

(Continued)

FOREIGN PATENT DOCUMENTS

| CN | 104799509 A | 7/2015 |
| CN | 105841851 A | 8/2016 |

(Continued)

OTHER PUBLICATIONS

"How to find your ideal bedtime with the Oura app", available online at <https://web.archive.org/web/20191206205332/https://ouraring.com/how-to-find-your-ideal-bedtime-with-the-oura-app/>, 2019, 8 pages.

(Continued)

*Primary Examiner* — Edward Tso
(74) *Attorney, Agent, or Firm* — BRYAN CAVE LEIGHTON PAISNER LLP

(57) ABSTRACT

A smart ring charging system comprises a charging source integrated into an object, the object configured to be held by a user wearing a smart ring. The smart ring may include a ring-shaped housing and a power source disposed within or at the ring-shaped housing and configured to receive energy from the charging source while the user is wearing the smart ring and holding the object. A controller may be disposed within or at the ring-shaped housing, or at the object with the charger and configured to estimate a charging rate at which the power source receives the energy from the charging source. The system may further include one or more indicators configured to indicate the charging rate.

20 Claims, 5 Drawing Sheets

(51) Int. Cl.
*H02J 7/00* (2006.01)
*A44C 9/00* (2006.01)
*H02J 7/02* (2016.01)

(58) Field of Classification Search
USPC .............................. 320/107, 108, 114, 115
See application file for complete search history.

(56) References Cited

U.S. PATENT DOCUMENTS

| | | | |
|---|---|---|---|
| 6,560,993 | B1 | 5/2003 | Bosque et al. |
| 7,013,674 | B2 | 3/2006 | Kretchmer |
| 7,500,746 | B1 | 3/2009 | Howell et al. |
| 7,872,444 | B2 | 1/2011 | Hamilton et al. |
| 8,075,484 | B2 | 12/2011 | Moore-Ede |
| 8,446,275 | B2 | 5/2013 | Utter, II |
| 8,570,273 | B1 | 10/2013 | Smith |
| 9,248,839 | B1 | 2/2016 | Tan |
| 9,362,775 | B1 | 6/2016 | Jacobs |
| 9,420,260 | B2 | 8/2016 | Mcgregor et al. |
| 9,477,146 | B2 | 10/2016 | Xu et al. |
| 9,509,170 | B2 | 11/2016 | Wu |
| 9,628,707 | B2 | 4/2017 | Blum et al. |
| 9,660,488 | B2 | 5/2017 | Breedvelt-Schouten et al. |
| 9,696,690 | B2 | 7/2017 | Nguyen et al. |
| 9,711,060 | B1 | 7/2017 | Lusted et al. |
| 9,711,993 | B2 | 7/2017 | Kim |
| 9,717,949 | B1 | 8/2017 | Tran et al. |
| 9,756,301 | B2 | 9/2017 | Li et al. |
| 9,847,020 | B2 | 12/2017 | Davis |
| 9,861,314 | B2 | 1/2018 | Haverinen et al. |
| 9,908,530 | B1 | 3/2018 | Fields et al. |
| 9,931,976 | B1 | 4/2018 | Terwilliger et al. |
| 9,955,286 | B2 | 4/2018 | Segal |
| 9,956,963 | B2 | 5/2018 | Kumar et al. |
| 9,965,761 | B2 | 5/2018 | Elangovan et al. |
| 10,007,355 | B2 | 6/2018 | Schorsch et al. |
| 10,085,695 | B2 | 10/2018 | Ouwerkerk et al. |
| 10,099,608 | B2 | 10/2018 | Cuddihy et al. |
| 10,102,510 | B2 | 10/2018 | Yau et al. |
| 10,137,777 | B2 | 11/2018 | Lu et al. |
| 10,315,557 | B2 | 6/2019 | Terwilliger et al. |
| 10,317,940 | B2 | 6/2019 | Eim et al. |
| 10,359,846 | B2 | 7/2019 | Priyantha et al. |
| 10,366,220 | B2 | 7/2019 | Shapiro et al. |
| 10,396,584 | B2 | 8/2019 | Madau et al. |
| 10,409,327 | B2 | 9/2019 | Stotler |
| 10,444,834 | B2 | 10/2019 | Vescovi et al. |
| 10,463,141 | B2 | 11/2019 | Fitzgerald et al. |
| 10,629,175 | B2 | 4/2020 | Yan et al. |
| 10,664,842 | B1 | 5/2020 | Bermudez et al. |
| 10,693,872 | B1 | 6/2020 | Larson et al. |
| 10,703,204 | B2 | 7/2020 | Hassan et al. |
| 10,745,032 | B2 | 8/2020 | Scheggi |
| 10,762,183 | B1 | 9/2020 | Charan et al. |
| 11,227,060 | B1 | 1/2022 | John et al. |
| 11,312,299 | B1 | 4/2022 | Assam |
| 11,479,258 | B1 | 10/2022 | Sanchez |
| 11,637,511 | B2 | 4/2023 | Sanchez |
| 2002/0121831 | A1 | 9/2002 | Egawa et al. |
| 2004/0200235 | A1 | 10/2004 | Kretchmer |
| 2005/0054941 | A1 | 3/2005 | Ting et al. |
| 2005/0230596 | A1 | 10/2005 | Howell et al. |
| 2006/0250043 | A1 | 11/2006 | Chung |
| 2008/0068559 | A1 | 3/2008 | Howell et al. |
| 2008/0218684 | A1 | 9/2008 | Howell et al. |
| 2008/0275309 | A1 | 11/2008 | Stivoric et al. |
| 2011/0007035 | A1 | 1/2011 | Shai |
| 2012/0184367 | A1 | 7/2012 | Parrott et al. |
| 2013/0335213 | A1 | 12/2013 | Sherony et al. |
| 2014/0107493 | A1 | 4/2014 | Yuen et al. |
| 2014/0118704 | A1 | 5/2014 | Duelli et al. |
| 2014/0120983 | A1 | 5/2014 | Lam |
| 2014/0218529 | A1 | 8/2014 | Mahmoud et al. |
| 2014/0238153 | A1 | 8/2014 | Wood et al. |
| 2014/0240132 | A1 | 8/2014 | Bychkov |
| 2014/0309849 | A1 | 10/2014 | Ricci |
| 2015/0003693 | A1 | 1/2015 | Baca et al. |
| 2015/0019266 | A1 | 1/2015 | Stempora |
| 2015/0046996 | A1 | 2/2015 | Slaby et al. |
| 2015/0062086 | A1 | 3/2015 | Nattukallingal |
| 2015/0065090 | A1 | 3/2015 | Yeh |
| 2015/0124096 | A1 | 5/2015 | Koravadi |
| 2015/0126824 | A1 | 5/2015 | Leboeuf et al. |
| 2015/0158499 | A1 | 6/2015 | Koravadi |
| 2015/0220109 | A1 | 8/2015 | Von et al. |
| 2015/0277559 | A1 | 10/2015 | Vescovi et al. |
| 2015/0338926 | A1 | 11/2015 | Park et al. |
| 2015/0352953 | A1 | 12/2015 | Koravadi |
| 2016/0028267 | A1 | 1/2016 | Lee et al. |
| 2016/0098530 | A1 | 4/2016 | Dill et al. |
| 2016/0226313 | A1 | 8/2016 | Okubo |
| 2016/0236692 | A1 | 8/2016 | Kleen et al. |
| 2016/0292563 | A1 | 10/2016 | Park |
| 2016/0317060 | A1 | 11/2016 | Connor |
| 2016/0334901 | A1 | 11/2016 | Rihn |
| 2016/0336758 | A1 | 11/2016 | Breedvelt-Schouten et al. |
| 2016/0361032 | A1 | 12/2016 | Carter et al. |
| 2017/0010677 | A1 | 1/2017 | Roh et al. |
| 2017/0012925 | A1* | 1/2017 | Tekin ..................... H04L 51/32 |
| 2017/0024008 | A1 | 1/2017 | Kienzle et al. |
| 2017/0026790 | A1 | 1/2017 | Flitsch et al. |
| 2017/0042477 | A1 | 2/2017 | Haverinen et al. |
| 2017/0053461 | A1 | 2/2017 | Pal et al. |
| 2017/0057492 | A1 | 3/2017 | Edgington et al. |
| 2017/0070078 | A1* | 3/2017 | Hwang ..................... H02J 7/34 |
| 2017/0075701 | A1 | 3/2017 | Ricci et al. |
| 2017/0080952 | A1 | 3/2017 | Gupta et al. |
| 2017/0090475 | A1 | 3/2017 | Choi et al. |
| 2017/0109512 | A1 | 4/2017 | Bower et al. |
| 2017/0129335 | A1 | 5/2017 | Lu et al. |
| 2017/0131772 | A1 | 5/2017 | Choi |
| 2017/0190121 | A1 | 7/2017 | Aggarwal et al. |
| 2017/0242428 | A1 | 8/2017 | Pal et al. |
| 2017/0346635 | A1 | 11/2017 | Gummeson et al. |
| 2017/0347895 | A1 | 12/2017 | Wei et al. |
| 2017/0374074 | A1 | 12/2017 | Stuntebeck |
| 2018/0025351 | A1 | 1/2018 | Chen et al. |
| 2018/0025430 | A1 | 1/2018 | Perl et al. |
| 2018/0032126 | A1 | 2/2018 | Liu |
| 2018/0037228 | A1 | 2/2018 | Biondo et al. |
| 2018/0039303 | A1 | 2/2018 | Hashimoto et al. |
| 2018/0052428 | A1 | 2/2018 | Abramov |
| 2018/0054513 | A1 | 2/2018 | Ma |
| 2018/0068105 | A1* | 3/2018 | Shapiro ................. H04L 9/3231 |
| 2018/0093606 | A1 | 4/2018 | Terwilliger et al. |
| 2018/0093672 | A1 | 4/2018 | Terwilliger et al. |
| 2018/0115797 | A1 | 4/2018 | Wexler et al. |
| 2018/0120892 | A1 | 5/2018 | Von et al. |
| 2018/0123629 | A1 | 5/2018 | Wetzig |
| 2018/0167200 | A1 | 6/2018 | High et al. |
| 2018/0174457 | A1 | 6/2018 | Taylor |
| 2018/0178712 | A1 | 6/2018 | Terwilliger et al. |
| 2018/0292901 | A1 | 10/2018 | Priyantha et al. |
| 2018/0300467 | A1 | 10/2018 | Kwong et al. |
| 2018/0322957 | A1 | 11/2018 | Dill et al. |
| 2019/0049267 | A1 | 2/2019 | Huang |
| 2019/0083022 | A1 | 3/2019 | Huang |
| 2019/0131812 | A1 | 5/2019 | Lee et al. |
| 2019/0155104 | A1 | 5/2019 | Li et al. |
| 2019/0155385 | A1 | 5/2019 | Lim et al. |
| 2019/0191998 | A1 | 6/2019 | Heikenfeld et al. |
| 2019/0230507 | A1 | 7/2019 | Li et al. |
| 2019/0265868 | A1 | 8/2019 | Penilla et al. |
| 2019/0286805 | A1 | 9/2019 | Law et al. |
| 2019/0287083 | A1 | 9/2019 | Wurmfeld et al. |
| 2019/0298173 | A1 | 10/2019 | Lawrence et al. |
| 2019/0332140 | A1 | 10/2019 | Wang et al. |
| 2019/0342329 | A1 | 11/2019 | Turgeman |
| 2019/0357834 | A1 | 11/2019 | Aarts et al. |
| 2020/0005791 | A1 | 1/2020 | Rakshit et al. |
| 2020/0070840 | A1 | 3/2020 | Gunaratne |
| 2020/0218238 | A1 | 7/2020 | Wang |
| 2020/0356652 | A1 | 11/2020 | Yamaguchi et al. |
| 2020/0391696 | A1 | 12/2020 | Kato et al. |

(56) References Cited

U.S. PATENT DOCUMENTS

| | | |
|---|---|---|
| 2021/0019731 A1 | 1/2021 | Rule et al. |
| 2021/0029112 A1 | 1/2021 | Palle et al. |
| 2021/0197849 A1 | 7/2021 | Tsuji |
| 2021/0382684 A1 | 12/2021 | Hachiya et al. |
| 2022/0083149 A1 | 3/2022 | Keller et al. |
| 2023/0027131 A1 | 1/2023 | Sanchez et al. |

FOREIGN PATENT DOCUMENTS

| | | |
|---|---|---|
| CN | 106360895 A | 2/2017 |
| CN | 206213423 U | 6/2017 |
| CN | 206333477 U | 7/2017 |
| CN | 206371611 U | 8/2017 |
| CN | 107139933 A | 9/2017 |
| CN | 107260139 A | 10/2017 |
| CN | 108900691 A | 11/2018 |
| CN | 108926081 A | 12/2018 |
| DE | 102015006677 A1 | 11/2016 |
| DE | 102019116618 A1 | 12/2020 |
| EP | 2581856 A1 | 4/2013 |
| KR | 10-2017-0087113 A | 7/2017 |
| WO | 2015/077418 A1 | 5/2015 |
| WO | 2017/136940 A1 | 8/2017 |
| WO | 2018/000396 A1 | 1/2018 |
| WO | 2018/154341 A1 | 8/2018 |
| WO | 2018/204811 A1 | 11/2018 |
| WO | 2019/082095 A1 | 5/2019 |
| WO | 2019/140528 A1 | 7/2019 |
| WO | 2019/180626 A1 | 9/2019 |

OTHER PUBLICATIONS

"Vauxhall/Opel In-Car Wireless Charging", retrieved from <https://www.air-charge.com/aircharge-for-business/automotive/vauxhall-wireless- charging>, Oct. 2019, 4 pages.

"Wireless charging for smart ring/pointing devices" available online at <http://www.humavox.com/smt_product/wireless-charging-for-smart-ringpointing-devices/>, Oct. 2019, 3 pages.

ASU projection wearable: Live tomorrow today (world first launch @ CES 2016). (Dec. 2015). ASU Tech, YouTube. Retrieved from https://www.youtube.com/watch?v=Wdb5O-D7Y0Y.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printing/, Sep. 6, 2017, pp. 11.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61.

Charles Q. Choi, "Low Battery? New Tech Lets You Wirelessly Share Power", available online at <https://www.livescience.com/54790-new-tech-enables-wireless-charging.html>. May 19, 2016, 9 pages.

Chen, X. A., et al., "Encore: 3D printed augmentation of everyday objects with printed-over, affixed and interlocked attachments," Nov. 5, 2015, pp. 73-82.

Chen, X. A., et al., "Reprise: A design tool for specifying, generating, and customizing 3D printable adaptations on everyday objects," Oct. 16, 2016, pp. 29-39.

E-Senses, "Personal vitamin D, sunlight and daylight coach", available online at <https://e-senses.com/>, 2019, 5 pages.

Hipolite, W., "The 3D printed Ö Bluetooth Ring is one of the tiniest personal computers you will ever see," 3DPrint.com. Retrieved from https://3dprint.com/34627/o-bluetooth-ring-3d-printed/, Jan. 2015, pp. 5.

Hussain Almossawi, "This smart ring aims to provide better lives for people with sickle cell disease", retrieved from <https://www.core77.com/projects/82131/This-Smart-Ring-Aims-to-Provide-Better-Lives-for-People-with-Sickle-Cell-Disease>, 2021, 9 pages.

Je et al., "PokeRing: Notifications by poking around the finger", Proceedings of the 2018 CHI Conference on Human Factors in Computing Systems—CHI'18, 2018, paper 542, pp. 1-10.

Katharine Schwab, "Orii, the ring that turns your finger into a phone, is here", available online at < https://www.fastcompany.com/90399237/orii-the-ring-that-turns-your-finger-into-a-phone-is-here >, 2019, 4 pages.

Magno et al., "Self-sustainable smart ring for long-term monitoring of blood oxygenation", IEEE Access, 2019, pp. 115400-115408.

Mahmud et al., "Wearable technology for drug abuse detection: A survey of recent advancements", Smart Health, vol. 13, Aug. 2019, 100062.

Margaret, "The Orb: A Bluetooth headset that turns into a ring", Gadgets, BornRich, Jun. 2013, available online at <http://www.bornrich.com/the-orb-a-bluetooth-headset-that-turns-into-a-ring.html >.

Nassi et al., "Virtual breathalyzer", Department of Software and Information Systems Engineering, Ben-Gurion University of the Negev, Israel, 2016, 10 pages.

Neev Kiran, "SkinnySensor: Enabling Battery-Less Wearable Sensors via Intrabody Power Transfer", Masters Theses 694, University of Massachusetts Amherst, 2018, 63 pages.

Nerd-Fu, "Push present", Delicious Juice Dot Com, Apr. 2015, available online at < https://blog.deliciousjuice.com/2015/04/ >.

Pablo E Suárez, "NXT Ring—Your Digital-self at Hand", available online at <https://www.youtube.com/watch?v=9w7uxDHs7NY>, uploaded on Jun. 21, 2019, 2 pages.

Roumen et al., "NotiRing: A comparative study of notification channels for wearable interactive rings", Proceedings of the 33rd Annual ACM Conference on Human Factors in Computing Systems—CHI'15, 2015, pp. 2497-2500.

Sarah Jacobsson Purewal, "Ringly review: The smart ring that could be sexier", available online at <https://www.macworld.com/article/227133/ringly-review-the-smart-ring-that-could-be-sexier.html>, 2016, 10 pages.

Schwab, K., "This startup wants to kill passwords-and replace them with jewelry. Fast Company," Retrieved from https://www.fastcompany.com/90254843/this-startup-wants-to-kill-passwords-and-replace-them-with-jewelry, (Oct. 2018), pp. 7.

Seung et al., "Nanopatterned Textile-Based Wearable Triboelectric Nanogenerator", ACS Nano, vol. 9, 2015, pp. 3501-3509.

Shane McGlaun, "Geek builds Bluetooth Smart Ring with OLED display", available online at <https://www.slashgear.com/geek-builds-bluetooth-smart-ring-with-oled-display-02361383/>, 2015, 6 pages.

Sperlazza, "We tested four sleep tracker apps and wearables: Here are the best ones", available online at <https://www.bulletproof.com/sleep/tech/best-sleep-tracker-apps/>, 2019, 18 pages.

Turunen, "Smart ring for stress control and self-understanding", available online at <https://slowfinland.fi/en/smart-ring-for-stress-control-and-self-understanding/>, 2017, 9 pages.

Wochit Tech. (2017). New smart ring monitors UV exposure [Video file]. Retrieved from https://www.youtube.com/watch?v=4YvkioTZxjU, 3 pages.

Worgan et al., "Garment level power distribution for wearables using inductive power transfer", 9th International Conference on Human System Interactions (HSI), 2016, pp. 277-283.

Xiao et al., "LumiWatch: On-arm projected graphics and touch input", Proceedings of the 2018 CHI Conference on Human Factors in Computing Systems—CHI'18, 2018, pp. 1-11.

Zhu et al., "Developing a driving fatigue detection system using physiological sensors", Proceedings of the 29th Australian Conference on Computer-Human Interaction—OZCHI '17, 2017, pp. 566-570.

Zhu, M. et al. "Fluidic fabric muscle sheets for wearable and soft robotics," Retrieved from https://arxiv.org/pdf/1903.08253.pdf, Mar. 2019, pp. 32.

Adafruit, p. 1-2, available at: https://www.adafruit.com/product/2806, published Jun. 2019 (Year: 2019).

https://en.wikipedia.org/w/index.php?title=Ring_size&oldid=891328817 (Year: 2019).

(56) References Cited

OTHER PUBLICATIONS

Laput et al., "Skin buttons: cheap, small, low-powered and clickable fixed-icon laser projectors", UIST '14: Proceedings of the 27th annual ACM symposium on User interface software and technology, Oct. 2014 pp. 389-394.
Mario, https://www.smartringnews.com/posts/smart-ring-vs-smartwatch-which-is-the-best-fitness-and-activity-tracker (Year: 2014).
Google translation of KR20170087113A (Year: 2016).
Adafruit.com, "RFID/NFC Smart Ring—Size 12—NTAG213", Accessed at: https://web.archive.org/web/20190605061438/https://www.adafruit.com/product/2806, publication Jun. 5, 2019 (Year: 2019).

\* cited by examiner

ENVIRONMENT-INTEGRATED SMART RING CHARGER

CROSS-REFERENCES TO RELATED APPLICATIONS

This application claims priority to U.S. Provisional Patent Application No. 62/877,391, filed Jul. 23, 2019, and U.S. Provisional Patent Application No. 62/990,123, filed Mar. 16, 2020, both incorporated by reference herein for all purposes.

FIELD OF THE DISCLOSURE

The present disclosure generally relates to smart ring wearable devices and, more specifically, to systems for charging smart ring devices with chargers integrated into objects in the environment for enabling charging when a user holds an object with an integrated charger while wearing the smart ring.

BACKGROUND

To the extent that smart ring technology has been adopted, it has a number of challenges. For example, a number of problems exist with wearable devices generally, including: they often need to be removed for charging; they often have poor fit; they often provide relatively little user interactivity; and they often provide limited functionality.

BRIEF SUMMARY

A smart ring charging system may be configured to transfer energy between a charging source outside of the ring housing and the power source of the smart ring disposed at the ring housing. The charging source may be disposed at an object that a user can grasp or hold. The charging may be initiated when the user holds the object with the charging source. A user interface of the charging system may include one or more indicators configured to indicate the charging rate of the power source disposed at the smart ring, at the object with the integrated charging source, or at another suitable location. The indicators may provide audio, visual, or haptic output indicative of the charging system operation. The energy transfer between the charging source and the power source may be wireless and may use inductive coupling. To that end; the smart ring may include a receiving induction coil configured to generate a voltage in response to a change in magnetic flux through the coil, the magnetic flux associated with one or more transmitting coils electrically connected to the charging source.

In one aspect; a smart ring charging system comprises a charging source integrated into an object, the object configured to be held by a user wearing a smart ring. The system further comprises the smart ring including: (i) a ring-shaped housing; (ii) a power source, disposed within or at the ring-shaped housing and configured to receive energy from the charging source while the user is wearing the smart ring and holding the object with the charging source; (iii) a controller; disposed within or at the ring-shaped housing and configured to estimate a charging rate at which the power source receives energy from the charging source; and (iv) one or more input/output (I/O) components, including a user interface disposed within or at the ring-shaped housing and configured to indicate when the charging rate is above a threshold.

In another aspect, a method for charging a smart ring comprises: integrating a charging source into an object, the object configured to be held by a user wearing a smart ring; transmitting; by the charging source, energy for charging a power source disposed within the smart ring; and receiving, by the power source disposed within the smart ring, the energy transmitted by the charging source while the user is wearing the smart ring and holding the object with the integrated charging source. The method further comprises: detecting, by a controller, that a charging rate at which the power source is receiving the energy from the charging source is above a threshold; and indicating; by a user interface, the charging rate in response to detecting that the charging rate is above the threshold.

Still, in another aspect; a smart ring charging system comprises a charging source integrated into an object, the object configured to be held by a user wearing a smart ring. The charging system also comprises the smart ring including: (i) a ring-shaped housing; (ii) a power source, disposed within or at the ring-shaped housing and configured to receive energy from the charging source while the user is wearing the smart ring and holding the object with the charging source; (iii) a controller, disposed within or at the ring-shaped housing and configured to estimate a charging rate at which the power source receives energy from the charging source; and (iv) one or more input/output (I/O) components, including a transmitter disposed within or at the ring-shaped housing and configured to transmit a signal indicative of the estimated charging rate. Furthermore, the system comprises one or more indicators disposed outside of the smart ring and configured to indicate the charging rate in response to the transmitted signal.

In yet another aspect, a smart ring charging system comprises a charging source integrated into an object, the object configured to be held by a user wearing a smart ring; a controller, disposed within or at the object with the charging source and configured to estimate a charging rate at which the power source receives energy from the charging source; and one or more indicators disposed within or at the object with the charging source and configured to indicate the charging rate. The system further comprises the smart ring including: (i) a ring-shaped housing; and (ii) a power source, disposed within or at the ring-shaped housing and configured to receive energy from the charging source while the user is wearing the smart ring and holding the object with the charging source.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Smart ring wearable technology can enable a wide range of applications including security, safety, health and wellness, and convenient interfacing between a user and a variety of technologies based at least in part upon integrating a variety of sensor, input/output devices, and computing capabilities in a compact form factor. One of the challenges in increasing smart ring capabilities is reliably powering the needed components, particularly considering the limited space for a power source in the compact form factor. An ability to conveniently charge a power source of a smart ring without removing the smart ring from a finger would contribute to the adoption of smart ring technology.

One way to charge a smart ring without removing the smart ring from the finger may include using a charger disposed in the environment of the smart ring. For example, the charger may be integrated into an object that a user may hold or grasp while a wearing a smart ring in a manner that allows a power source of the smart ring to charge. For the purposes of charging, the charger may connect to the smart ring worn by the user by a cable or via a socket. Additionally or alternatively, the smart ring and the charger may be configured for wireless energy transfer. Some wireless energy transfer techniques may rely on generated variable electromagnetic fields at a charging source that may couple a portion of the generated energy to the power source of the smart ring. To that end, the charging source and the smart ring may include inductively coupled coils—a transmitting coil at the charging source and a receiving coil at the ring.

Various techniques, systems, and methods for charging a power source of a smart ring using charging sources integrated into objects in the environment of the smart ring are discussed below with reference to FIG. 1, FIG. 2, FIG. 3, FIG. 4, FIG. 5A, FIG. 5B, and FIG. 5C. In section I, a smart ring and environment-integrated charging system is described with reference to FIG. 1. In section example smart ring form factor types and configurations to facilitate connections to an integrated charging source are discussed with reference to FIG. 2 and FIG. 3. In section III, an example operating environment in which a smart ring and the charging system may operate is described with reference to FIG. 4. In section IV, example schematics for a charging system with an environment-integrated charging source are described with reference to FIG. 5A, FIG. 5B, and FIG. 5C. In section V, other considerations are described.

I. Examples of Smart Ring and Smart Ring Components

Figure 1:
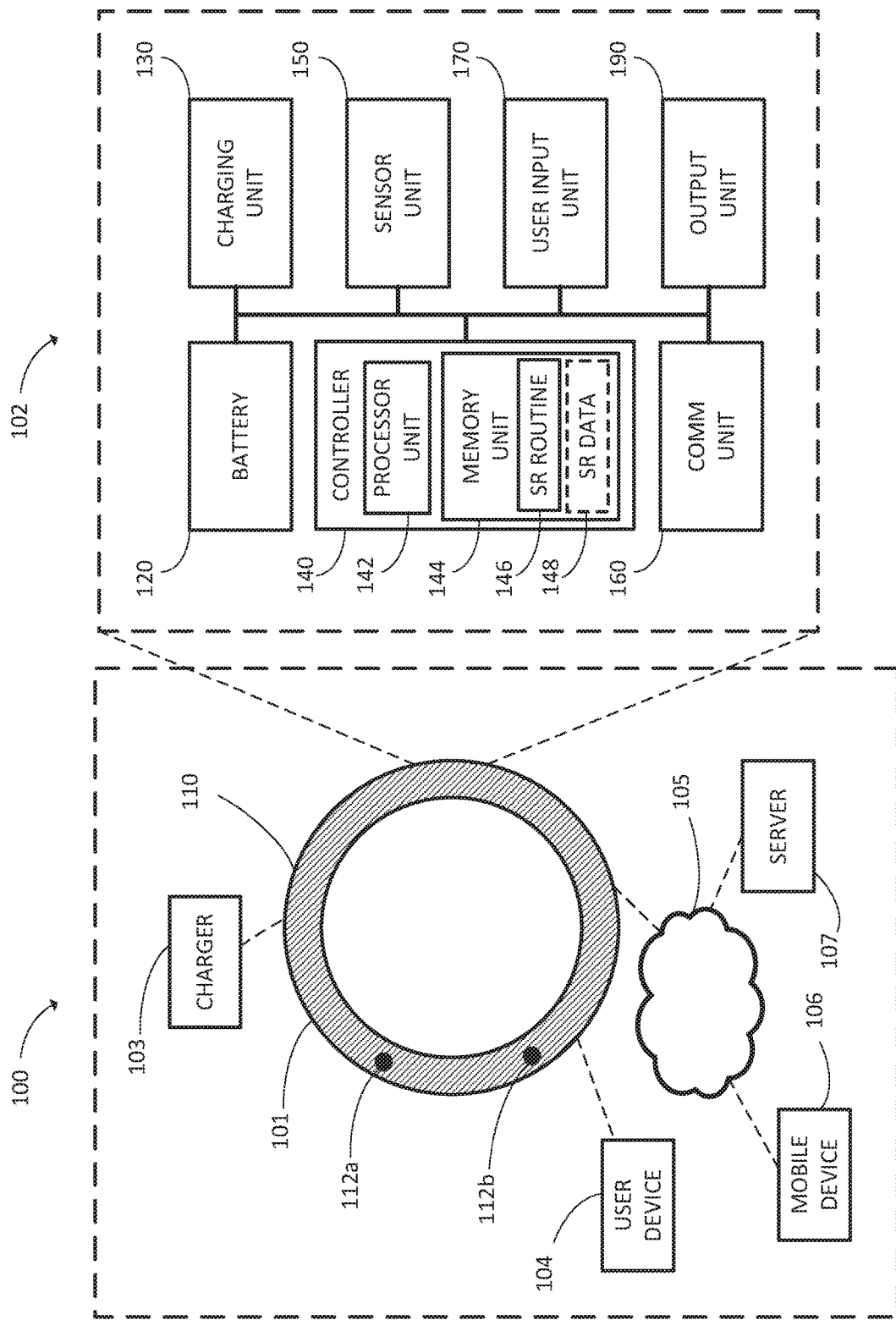
FIG. 1 illustrates a system comprising a smart ring and a block diagram of smart ring components according to some embodiments.

FIG. 1 illustrates a system 100 comprising a smart ring 101 that may be charged via a charging system according to one or more of the techniques described herein. FIG. 1 also shows one or more devices or systems that may be electrically, mechanically, or communicatively connected to the smart ring 101. As shown, the smart ring 101 may include a set of components 102, which may have various power needs and may impact the frequency with which the smart ring 101 needs recharging. Some of the components 102 may interact, as described below, with the components of the charging system disposed outside of the smart ring. Furthermore, in implementations where the charging system uses wireless transfer of electromagnetic energy between the charging source and the smart ring, the components 102 may be configured to be compatible with the electromagnetic fields to which the components 102 may be exposed during charging.

The system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120 as a power source, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170), In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), capacitive or any other suitable type of sensor. The sensor unit 150 may include, for example, an inertial motion unit (IMU) for detecting orientation and movement of the ring 101. Additionally or alternatively, the sensor unit 150 may include one or more sensors for measuring proximity or pressure.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.) The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiber-optic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical, mechanical) devices; electronic displays for optical output, such as an organic light emitting device (©LED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

II. Example Smart Ring Form Factor Types

Figure 2:
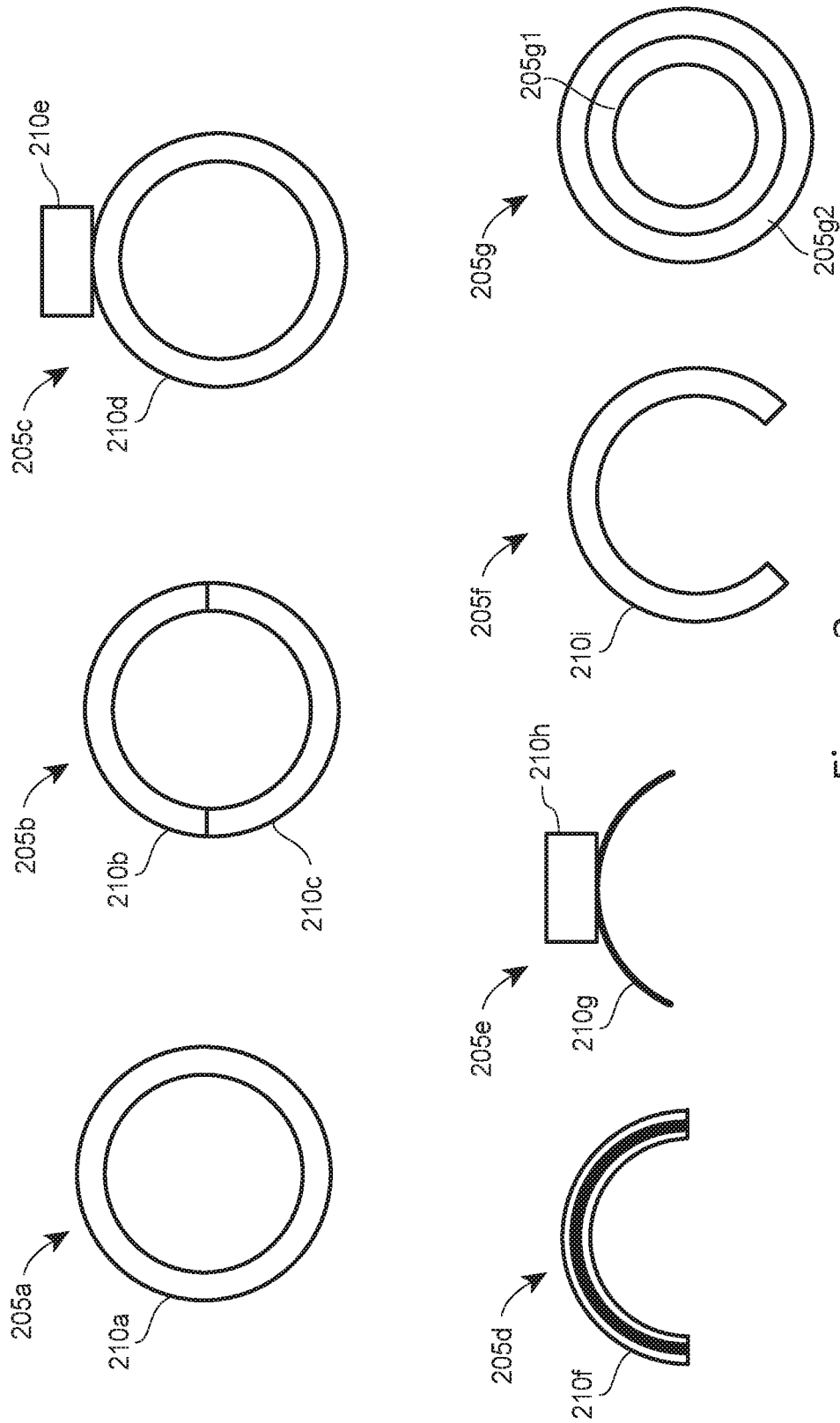
FIG. 2 illustrates a number of different form factor types of a smart ring according to some embodiments.

FIG. 2 includes block diagrams of a number of different example form factor types or configurations 205a, 205b, 205c, 205d, 205e, and/or 205f of a smart ring (e.g., the smart ring 101). In a charging system, the variety of configurations of the ring-shaped housing may influence, or, conversely, depend on the technique of energy transfer between a charging source and a power source of the smart ring. Furthermore, the configurations 205a, 205b, 205c, 205d, 205e, and/or 205f may depend on or determine the types of indicators or communication components disposed at the ring.

The configurations 205a, 205b, 205c, 205d, 205e, and/or 205f (which may also be referred to as the smart rings 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a-f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c, The two housing parts 210b and 210c may each house at least some of the components 102, distributed between the housing parks 210b and 210c in any suitable manner. The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be capable of being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes that a fully annular band (360 degrees), and may be elastic. A restorative force produced by a deformation of the housing 210i may ensure a suitable physical contact with the finger.

The configuration 205g may be configured to have two rings, a first ring 205g1 capable of and adapted to be mounted onto a finger of a user, and a second ring 205g2 capable of and adapted to be directly mounted onto the first ring 205g1, as depicted in FIG. 2. Said another way, the first ring 205g1 and the second ring 205g2 are arranged in a concentric circle arrangement, such that the second ring 205g2 does not contact a user's finger when the smart ring 205g is worn. Rather, only the first ring 205g1 contacts the user's finger. Additional suitable combinations of configurations (not illustrated) may combine at least some of the housing features discussed above.

Figure 3:
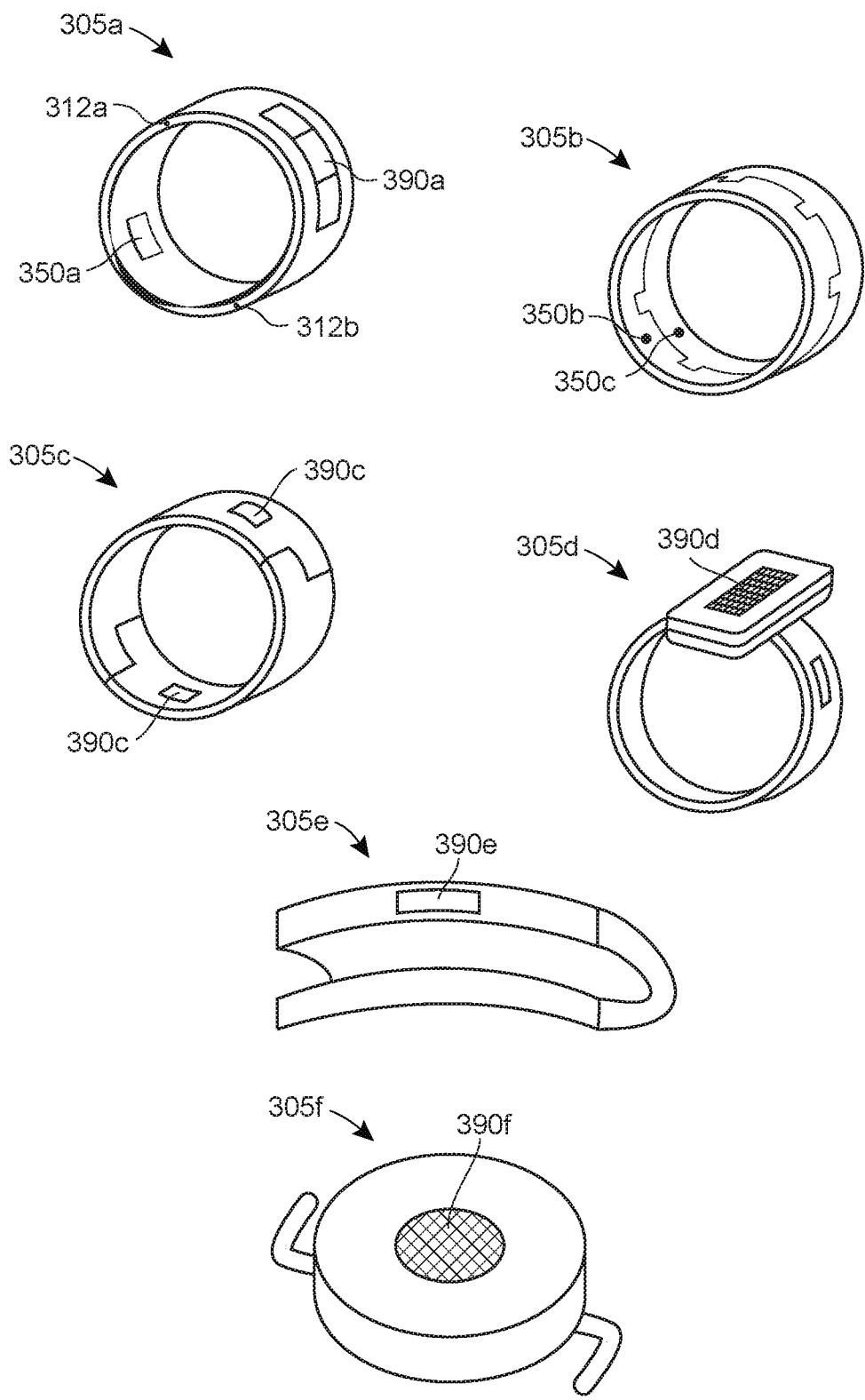
FIG. 3 illustrates examples of different smart ring form factors.

FIG. 3 includes perspective views of example configurations 305a, 305b, 305c, 305d, 305e, and/or 305f of a smart ring (e.g., the smart ring 101) in which a number of surface elements are included. In a charging system, the variety of configurations of the smart ring may influence, or, conversely, depend on the technique of energy transfer between a charging source and a power source of the smart ring. Additionally, some of the surface elements may be configured to indicate when a charging rate of the smart ring rises above or falls below a threshold, the charge remaining at the power source, etc.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a. Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively, Output devices 390d, 390e, 390f on the corresponding configurations 305d-f may be LCD display, OLE© displays, e-ink displays, one or more LED pixels, speakers, or any other suitable output devices that may be a part of a suite of outputs represented by an output unit (e.g., output unit 190), Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

III. Example Operating Environment for a Smart Ring

Figure 4:
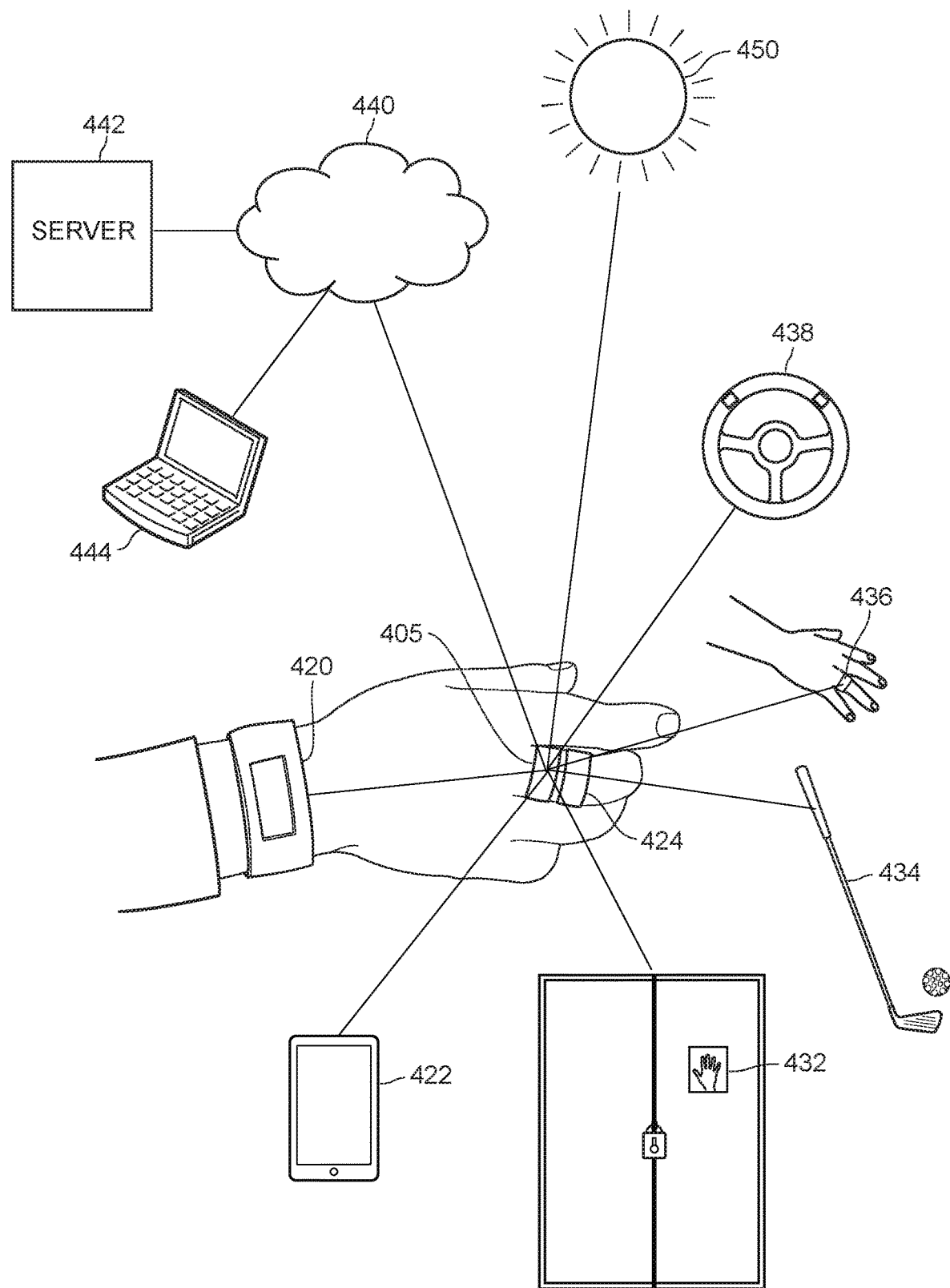
FIG. 4 illustrates an environment within which a smart ring may operate according to some embodiments.

FIG. 4 illustrates an example environment 400 within which a smart ring 405 may be configured to operate. The environment 400 includes examples of objects at which a charging source may be advantageously disposed in the charging systems discussed in this disclosure. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a-i) of the ring 405. Other wearable charging devices may transfer charge to the ring 405 by any suitable means. In some implementations, a user may wear a glove with a built-in charging device configured to charge the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

IV. Examples of Charging Systems for a Smart Ring

Figure 5A:
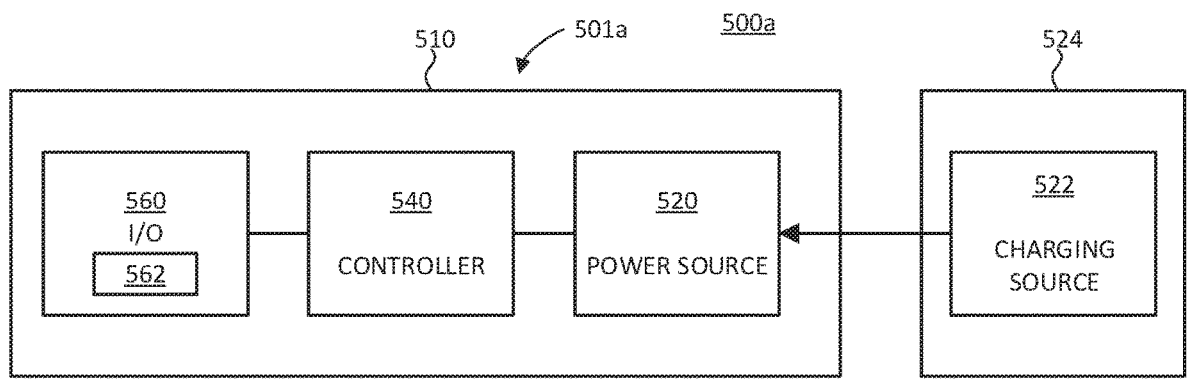
FIG. 5A, FIG. 5B, and FIG. 5C are schematic diagrams of example implementations of a charging system with an environment-integrated charging source for a smart ring.
Figure 5B:
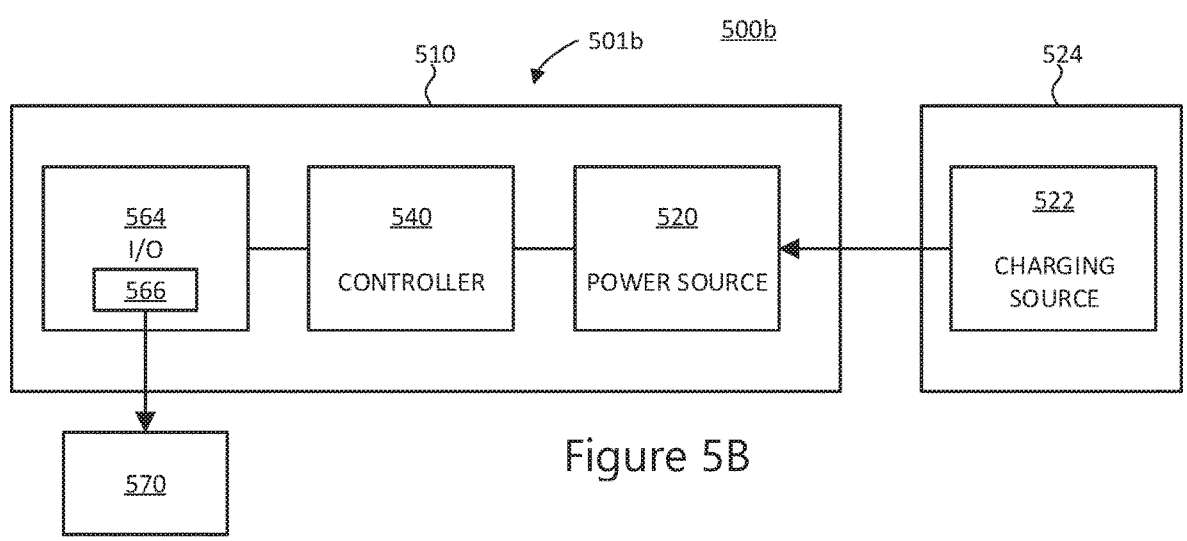
Figure 5C:
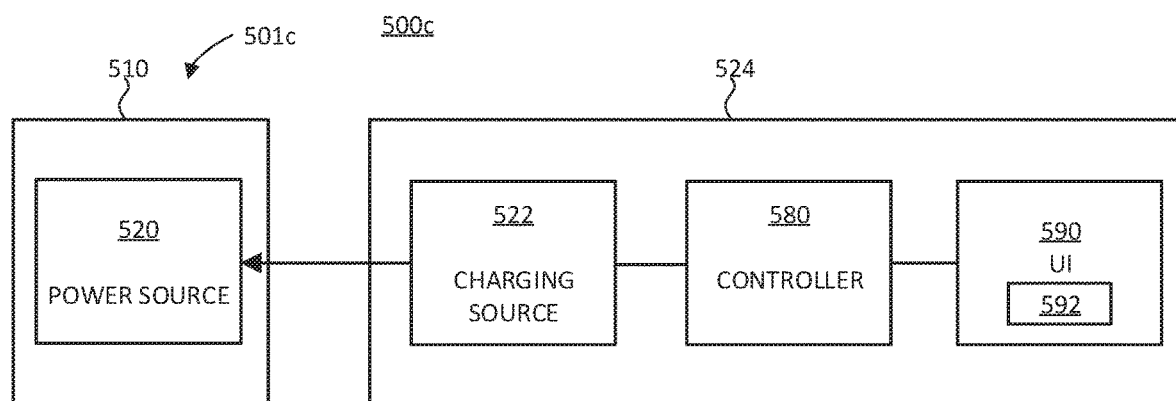

FIG. 5A, FIG. 5B, and FIG. 5C are schematic diagrams of example charging systems 500a, 500b, 500c for corresponding smart rings 501a, 501b, 501c. The smart rings 501a, 501b, 501c may exemplify the smart ring 101 of FIG. 1 or the smart ring 405 of FIG. 4 operating within the environment 400. As discussed below, the smart rings 501a, 501b, 501c may be configured for charging from charging sources integrated in some objects (e.g., golf club 434, steering wheel 438) disposed in the environment 400. Thus, a user of the smart ring 405 may advantageously charge the smart ring 405 in the course of the user's activities and without removing the ring 405 from the finger.

In FIG. 5A, for example, a ring-shaped housing 510 includes a power source 520 (e.g., battery 120) configured to receive energy from a charging source 522. The charging source 522 may be integrated into an object 524 (e.g., golf club 434, steering wheel 438, or another suitable object configured to be held by a user), so as to facilitate charging the power source 520 while the user is wearing the smart ring 501a and holding the object 524. The charging source 522 may be integrated into the object during a manufacturing step for the object 524. Alternatively, the charging source 522 may be a separate article of manufacture disposed at the object 524 as an addition, installed, for example, by the user of the object 524. If the charging source 522 disposed at the object 524 does not substantially impede the original use of the object 524, while facilitating the charging as described herein, the charging source 522 may be considered, in a sense, to be installed at the object 524. Besides the examples illustrated in the environment 400, the object 524 may be, for example, a handlebar of a motorcycle or a bicycle. Alternatively, the object 524 may be a hand-held object such as a cane, a tennis racket, an umbrella, etc. In some implementations, the object 524 may include an energy harvesting circuit configured to harvest kinetic, solar, thermal, or ambient radio energy and to supply the harvested energy to the charging source for subsequent transfer to the smart ring 501a.

A controller 540 (e.g., the controller 140) and one or more input/output (I/O) components 560 may be disposed within the ring-shaped housing 510. Both the controller 540 and the I/O components 560 may be electrically connected to and draw energy from the power source 520. Furthermore, the controller 540 may be communicatively connected to the power source 520 and to the I/O components 560. The I/O components 560 may implement, for example, the communication unit 160, the user input unit 170, or the output unit 190 of the smart ring 101. The I/O components 560 may include a user interface (UI) 562. The user interface 562 may include one or more visual indicators (e.g., light emitting diodes (LEDs), a display, etc.), one or more audio indicators (e.g., a speaker, a buzzer, etc.), or one or more haptic indicators (e.g., a haptic motor, a piezoelectric actuator, a voice coil, a micro-heater, etc.).

The controller 540 may be configured to estimate a charging rate at which the power source 520 receives energy from the charging source 522. To that end, the controller 540 may include a circuit that monitors voltage across the terminals of the power source 520. Additionally or alternatively, the controller 540 may include a circuit for monitoring current flowing into the power source 520. In some implementations, voltage or current monitoring circuits may be integrated into the power source 520 and the power source 520 may send signals indicative of the monitored voltage or current to the controller 540. In any case, the controller 540 may estimate a charging rate at which the power source 520 receives energy from the charging source 522 based at least in part upon the monitored current or voltage. The controller 540 may use a single sample or multiple samples of monitored current to estimate the charging rate. Additionally or alternatively, the controller 540 may use multiple samples of the monitored voltage at the power source as well as the time between the samples to estimate the charging rate. In some implementations, the controller 540 may estimate the charging rate averaged over a suitable time interval that may be 1, 2, 5, 10, 20, 50, 100 sec or any other suitable interval.

The controller 540 may compare the estimated charging rate to a threshold. The threshold charging rate may be, for example, 0.01 mAh/min, 0.1 mAh/min, 1 mAh/min, 10 mAh/min, etc. corresponding to currents of 0.6 mA, 6 mA, 60 mA, or 600 mA, etc. In response to detecting that the charging rate is above the threshold, the controller 540 may cause the I/O components to indicate that the power source 520 is charging using the user interface 562. In some implementations, when the charging rate is below the threshold for a pre-determined duration, the charging system 500a may cause the charging source 522 to switch off, as described in more detail below.

In some implementations, the controller 540 may cause an LED disposed at the ring-shaped housing 510 to turn on and remain turned on or to flash periodically to indicate that charging is in progress. Brightness, flashing rate, or flashing pattern of the LED may indicate the charging rate in some applications. In some implementations, the controller 540 may cause an organic LED (©LED), a liquid-crystal, or an e-ink display disposed at the ring-shaped housing 110 to display one or more symbols or characters indicative of the charging rate.

Additionally or alternatively, the controller 540 may cause an audio indicator of the user interface 562 (e.g., a buzzer, a speak, etc.) disposed at the ring-shaped housing 510 to produce a tone, a buzz, or any suitable sound to indicate that the power source 520 is charging. The tone, the buzz or any other sound may vary to indicate the charging rate of the power source 520.

Still additionally or alternatively, the user interface 562 may include a haptic indicator (e.g., a vibration motor, a voice coil, a piezo actuator, etc.) to provide the user with haptic feedback indicative of the charging rate, for example. For example, the controller 540 may cause the haptic indicator to produce a vibration or a sequence of taps of intensity, frequency, duration, and/or pattern indicative of the charging rate.

The charging system 500a may include a wired connection between the charging source 522 and the power source 520. In some implementations, the power source 520 may complete a circuit with the charging source 522 to thereby initiate charging. In other implementations, the charging source may include a switch and one or more sensors, with the switch configured to enable charging based at least in part upon the one or more sensors. In some implementations, the sensors at the charging source 522 may be configured to sense the load impedance to identify the power source 520 before initiating charging. Additionally or alternatively, the sensors at the charging source 522 may be configured to sense the voltage level at the power source 520 to determine whether the power source 520 is in need of charging, for example, and activate charging based at least in part upon the sensor output.

To facilitate charging via a wired connection of the power source 520 by the charging source 522, the charging source 522 and the power source 520 may include mating connectors. Furthermore, the object 524 into which the charging source is integrated may include one or more registration structures that aid in aligning the smart ring with the charging source 522 at the object 524 to facilitate the mating of the connectors. Furthermore, the one or more registration structures may give tactile feedback to the user indicative that the smart ring 501a is in position or, in some implementations, nearly in position for charging.

In some implementations, the power source 520 is configured to receive power from the charging source 522 by way of a wireless connection. For example, the wireless connection for power transfer may be implemented using inductive coupling. Specifically, the charging source 522 may include an oscillator (possibly followed by one or more amplifiers) supplying alternating current (AC) to a transmitting coil also disposed at the charging source 522. The power source 520 of the smart ring may receive energy from the charging source 522 via a charging unit (e.g., the charging unit 130 in FIG. 1) that includes a receiving coil and rectifying components. When the active transmitting coil is in suitable proximity to the receiving coil, magnetic flux generated by the current in the transmitting coil induces an AC voltage across terminals of the receiving coil. The rectifying components (e.g., suitably arranged diodes and capacitors) may rectify and smooth (i.e., convert to direct current (DC) waveform suitable for charging the power source 520) the AC waveform. Thus, the power source 520 may receive, via the receiving coil, the electrical energy transmitted by the charging source 522 via the transmitting coil.

Wireless power transfer via inductive coupling may rely on one or both of two general techniques. In the first, the transmitting and receiving coils are disposed in close proximity and coaxial alignment so that the magnetic flux through one coil largely goes through the other coil. Thus, the coils are closely-coupled. The degree to which the magnetic flux is shared between the two coils can be quantified as a coupling coefficient, which may be 0.05, 0.1, 0.2, 0.4, 0.6, 0.8 or another suitable value. Power transfer efficiency may be largely dependent on and marginally smaller than the coupling coefficient.

The second inductive coupling technique uses resonant inductive coupling. In this technique, the transmitting and receiving coil may have a substantially smaller coupling coefficient. On the other hand, the transmitting and receiving inductive coils may be connected to corresponding capacitive elements to form corresponding resonant circuits that, when properly tuned, ensure efficient power transfer despite a reduced coupling coefficient. The frequency of the oscillator may be tuned to match the resonance frequency of the circuits. The resonant inductive power transfer may transfer power with greater separation between the transmitting and receiving coils, though power transfer efficiency may be smaller (e.g., efficiency of 1, 2, 5, 10%) than when using closely-coupled coils.

With either closely-coupled coils or resonant inductive coupling, the rate of wireless transmission of energy may vary substantially in response to the relative position between transmitting and the receiving coils. Thus, the indicators in the user interface 562, such as the ones described above, may prompt the user to adjust the position of a hand (with the smart ring) holding the object 524 so as to achieve a higher charging rate. Additionally or alternatively, it may be advantageous to dispose indicators outside of the smart ring. For example, in some implementation or situations, the indicators disposed at the ring may not be easily noticeable by a user. Also, disposing indicators outside of the ring-shaped housing 510 may reduce the power consumption for the power source 520.

FIG. 5B schematically illustrates the charging system 500b in which the ring-shaped housing 510 includes a set of I/O components 564 that include a transmitter 566 (that may be referred to, more generally, as a communication component and may be a part of a transceiver) configured to transmit communication signals to a communication device external to the ring-shaped housing 510. The communication signal transmitted by the transmitter 566 may be indicative of the charging rate. One or more indicators, including indicator 570 may be disposed outside of the smart ring 501b and configured to indicate the charging rate in response to the signal transmitted by the transmitter 566. To that end, the indicator 570 may be in communicative connection with a receiver configured for receiving the signals transmitted by the transmitter 566. For example, the transmitter 566 and the corresponding receiver may be configured to communicate over radio waves using a WiFi, a Bluetooth, a Bluetooth Low Energy (BLE), or any other suitable protocol. In some implementations, the transmitter 566 and a corresponding receiver may implement an infrared link between the smart ring and the indicator 570.

The indicator 570 may be a visual indicator, an audio indicator, or a haptic indicator and may be disposed at any convenient location. For example, in implementations where the object 524 with the charging source 522 is a steering wheel of a vehicle or a handlebar of a motorcycle, the indicator 570 may be disposed at a corresponding head unit of the vehicle or the motorcycle. The indicator 570 may also be an audio indicator disposed within the audio system of the vehicle or the motorcycle.

In some implementations, the indicator 570 may be disposed at the object 524. For example, when the object is a golf club or a tennis racket, the indicator may be an LED, or a haptic motor disposed at a corresponding handle of the object 524. In some implementations, the indicator 570 may be integrated with the charging source 522 disposed at the object 524, as discussed in more detail below.

In other implementations, the indicator 570 may be integrated into a mobile device (e.g., a smart phone, a smart watch, or another suitable device other than the smart ring) of the user. For example, a smart ring application running on a smart phone of the user may generate, based at least in part upon the signal received from the transmitter 566, notifications indicative of the charging rate of the smart ring and use any of the output device of the smart phone as the indicator 570.

Multiple indicators 570 may be used to indicate the charging rate of the smart ring power source 520 to the user. The indicators may be disposed at multiple locations and may be configured to receive the one or more signals indicative of the charging rate of the power source from the transmitter 566. In an alternative implementation, the user mobile device may receive the signal from the transmitter 566, and may in turn cause multiple indicators 570, disposed at or communicatively connected to the mobile device, to indicate the charging rate.

FIG. 5C schematically illustrates the charging system 500c in which estimating the charging rate at which the power source 520 receives energy from the charging source 522 and indicating the charging rate (e.g., when the charging rate is above a threshold) is implemented by components disposed at the object 524 with the charging source 522. To that end, a controller 580 and a user interface 590, including one or more indicators, are disposed at the object 524. The controller 580 may be communicatively connected to the charging source 522 and to the user interface 590. The controller 580 may estimate the charging rate using a technique suitable for the implemented method of charging. For example, when the charging source 522 is configured to transmit power to the power source 520 via a wired connection, the controller 580 may estimate the charging rate using a circuit indicative of current supplied by the charging source 522. This approach may work well for a wired connection in which charging efficiency is substantially stable. When the charging source 522 is configured to transmit power to the power source 520 via a wireless connection, on the other hand, the controller 580 may rely on additional techniques to estimate the charging rate. For example, the controller 580 may include or be electrically connected to a circuit configured for measuring a reflection coefficient at the output or another suitable stage of the charging source 522. The reflection coefficient may be indicative of the coupling efficiency between the wireless power transfer elements (e.g., coils, as described above) of the charging source 522 and the power source 520, and, consequently, of the charging rate.

Additionally or alternatively, the power source 520 of the charging system 500c may be communicatively connected to a controller (e.g., controller 540) disposed in the ring-shaped housing 510. The controller of the smart ring may be configured to communicate with the controller 580 connected to the charging source 522 via corresponding communication components (e.g., at the smart ring—communication unit 160 or transmitter 566 and a suitable counterpart at the object 524). For example, the controller 540 connected to the power source 520 may estimate the charging rate of the power source 520 using one of the techniques described above and send a signal, indicative of the charging rate, via the communication component at the smart ring. The controller 580 may receive, via the communication unit at the object 524, the signal indicative of the charging rate and cause the user interface 590 to indicate the whether there is charging, whether the charging rate is above a threshold, etc. In some implementations, a component configured for the wireless charging may be integrated in the same chip with the communication components that exchange signals indicative of the charging.

In the charging systems 500a, 500b, 500c described above, the charging source 522 may be configured to activate, conditionally, in response to detecting a connection to or proximity of the power source 520. In the case of a wired power transfer connection, the conditional activation of the charging source 522 may prevent the charging source 522 from transferring power to an incompatible device or to a spurious load, such as an accidental short circuit. In the case of the wireless power transfer connection, the conditional activation of the charging source 522 may prevent wasting power. Conditional activation of the charging source 522 may prevent, for example, activation the transmitting coil of an inductive coupling system when the receiving coil is not in the condition to receive the power.

To detect proximity of the smart ring to the charging source 522, the object 524 may include one or more sensors. The one or more sensors may include optical, capacitive, radio frequency identification (RFID), ultrasonic, pressure or any other suitable sensors capable of detecting a hand of a user or the smart ring directly. The charging source 522 may be configured to activate (i.e., start transmitting energy) in response to the detection. Furthermore, the charging source 522 may be configured to subsequently deactivate (i.e., stop transmitting energy) after a delay and upon determining that the estimated charging rate is below a threshold.

Additionally or alternatively, a user interface, disposed at the object 524 (e.g., in the charging system 500c), at the ring-shaped housing 510 (e.g., in the charging system 500a), or elsewhere (e.g., in the charging system 500b) may be configured to indicate proximity of the smart ring to the charging source 522. In some implementations, the indication of proximity may allow the user to adjust the position of the smart ring with respect to the charging source 522 to facilitate charging. For example, a user interface may indicate proximity of the smart ring to the charging source and a low charging rate. In response, the user may then adjust a grip on the object (e.g., a steering wheel) to increase the charging rate. In an implementation, a grip on the steering wheel that substantially maximizes the charging rate may be associated with the recommended hand position from the consideration of safety.

In general, the charging systems 500a, 500b, 500c may include sensors, communication components, and indicators disposed at the corresponding smart rings 501a, 501b, 501c, at the object 524, or elsewhere in the environment. These sensors, communication components, and indicators may cooperate, as described above, with each other and with the controllers 540, 580 to facilitate the transfer of energy from the charging source 524 to the power source 520 in an efficient manner. The efficiency may be improved by a user responding to the indicators to actively facilitate or terminate the charging operation, or by the controllers 540, 580 responding to sensors and automatically initiating, adjusting, or terminating the charging operation.

V. Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout his specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems; and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link, A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A smart ring charging system comprising:
a charging source integrated into an object configured to be held by a user wearing a smart ring, the smart ring including:
a ring-shaped housing;
a power source disposed within or at the ring-shaped housing and configured to receive energy from the charging source while the user is wearing the smart ring and holding the object;
a controller disposed within or at the ring-shaped housing and configured to estimate a charging rate at which the power source receives the energy from the charging source; and
one or more input/output (I/O) components including a user interface disposed within or at the ring-shaped housing and configured to indicate when the charging rate is above a threshold.

2. The system of claim 1, wherein the one or more I/O components of the smart ring further include:
an I/O component configured to sense a physical phenomenon external to the ring-shaped housing.

3. The system of claim 1, wherein the one or more I/O components of the smart ring further include:
an I/O component configured to transmit a communication signal to a communication device external to the ring-shaped housing, wherein the communication signal is indicative of the charging rate.

4. The system of claim 1, wherein:
the power source is configured to receive power from the charging source by way of a wired connection.

5. The system of claim 1, wherein:
the power source is configured to receive power from the charging source by way of a wireless connection.

6. The system of claim 5, wherein:
the object including the charging source further includes one or more sensors that detect a proximity of the smart ring to the charging source; and
the charging source is configured to transmit energy at least in part in response to the detected proximity.

7. The system of claim 6, wherein:
the user interface is further configured to indicate the detected proximity.

8. The system of claim 1, wherein:
the user interface is configured to indicate when the charging rate is above the threshold via an audio indicator.

9. The system of claim 1, wherein:
the user interface is configured to indicate when the charging rate is above the threshold via a visual indicator.

10. The system of claim 1, wherein:
the user interface is configured to indicate when the charging rate is above a threshold via a haptic indicator.

11. The system of claim 1, wherein:
the object including the charging source is one of a steering wheel of a vehicle, a handle bar of a motorcycle, or a handle bar of a bicycle.

12. The system of claim 1, wherein:
the object including the charging source is one of a golf club, a tennis racket, or a cane.

13. A method for charging a smart ring comprising:
implementing a charging source integrated into or disposed at an object that is configured to be held by a user;
transmitting, by the charging source, energy for charging a power source disposed within a smart ring configured to be worn by the user;
receiving, by the power source disposed within the smart ring, the energy transmitted by the charging source;
detecting, by a controller of the smart ring, that a charging rate at which the power source is receiving the energy from the charging source is above a threshold; and
indicating, by a user interface, the charging rate in response to detecting that the charging rate is above the threshold.

14. The method of claim 13, further comprising:
transmitting, by a transmitter disposed within the smart ring, a wireless signal indicative of the charging rate; and
receiving, at the user interface, the wireless signal, wherein indicating the charging rate by the user interface occurs in response to the user interface receiving the wireless signal and identifying the charging rate by decoding the wireless signal.

15. The method of claim 14, wherein the user interface is integrated into a dash of a vehicle.

16. The method of claim 14, wherein the user interface is integrated into a mobile device.

17. The method of claim 14, wherein indicating the charging rate comprises generating an audio indication.

18. The method of claim 13, further comprising:
detecting, by one or more sensors of the smart ring, a proximity of the smart ring to the charging source; and
indicating, by the user interface, the detected proximity.

19. The method of claim 18, wherein transmitting, by the charging source, the energy for charging the power source disposed within the smart ring comprises:
transmitting the energy in response to detecting the proximity by the one or more sensors.

20. The method of claim 13, wherein transmitting, by the charging source, the energy for charging the power source disposed within the smart ring comprises:
wirelessly providing the energy from the charging source to the power source by:
supplying alternating current (AC) to a transmitting coil disposed within the charging source; and
receiving, at the power source, the energy via a receiving coil disposed at the smart ring and inductively coupled to the transmitting coil.

* * * * *